United States Patent [19]
Douglas

[11] 3,832,722
[45] Aug. 27, 1974

[54] APPARATUS AND SYSTEM FOR FLASH PHOTOGRAPHY

[75] Inventor: Lawrence M. Douglas, South Easton, Mass.

[73] Assignee: Polaroid Corporation, Cambridge, Mass.

[22] Filed: Mar. 15, 1973

[21] Appl. No.: 341,730

Related U.S. Application Data

[63] Continuation of Ser. No. 168,671, Sept. 3, 1971, abandoned.

[52] U.S. Cl.............................. 354/29, 354/30, 354/59, 354/196, 354/230
[51] Int. Cl. .............................................. G03b 7/16
[58] Field of Search......... 95/10 CE, 10 CT, 10 CD, 95/64 A

[56] References Cited
UNITED STATES PATENTS

| | | | |
|---|---|---|---|
| 3,433,144 | 3/1969 | Ivester | 95/64 A |
| 3,473,452 | 10/1969 | Ivester | 95/64 A |
| 3,478,660 | 11/1969 | Land | 95/64 A |
| 3,654,843 | 4/1972 | Veda et al. | 95/10 CE |

*Primary Examiner*—Joseph F. Peters, Jr.
*Assistant Examiner*—Russell E. Adams, Jr.
*Attorney, Agent, or Firm*—Gerald L. Smith

[57] ABSTRACT

An exposure control mechanism featuring a follow-focus mechanism. This mechanism includes a face-groove cam mounted upon a focus adjusting wheel along with a cam follower mounted upon a focus adjusting wheel along with a cam follower mounted co-pivotally therewith. By adjusting the radial orientation of the cam follower, the follow-focus mechanism may be selectively trimmed.

57 Claims, 10 Drawing Figures

APPARATUS AND SYSTEM FOR FLASH PHOTOGRAPHY

RELATED APPLICATIONS

This is a continuation of U.S. Pat. application Ser. No. 168,671, filed Aug. 3, 1971, now abandoned.

BACKGROUND OF THE INVENTION

When operated in conjunction with flash or transient illumination, the exposure mechanism of a photographic camera usually is adjusted in accordance with the levels of illumination anticipated at a scene being photographed. To anticipate these levels, an evaluation is made based upon an application of the inverse square law of light energy propagation. Under this law, the light energy available from a given source is considered to vary inversely with the square of the distance from that source. Accordingly, to make an appropriate exposure mechanism adjustment for flash photography, light source-to-subject distance is derived and the value of this distance is utilized to compute an appropriate exposure value or illuminational factor.

In some camera designs, exposure control adjustment for flash operation is effected automatically by incorporating within the apparatus what is termed as a "follow-focus" system. With a follow-focus arrangement, aperture adjustment or flash illumination output control is mechanically coupled with the range finding or focusing system of a camera. In effect, a follow-focus control represents a second exposure control system for a camera. As such, its presence necessarily contributes to the size and complexity of a camera.

Where aperture is adjusted as a follow-focus procedure, the exposure control housing of a camera must incorporate one aperture adjustment mechanism for daylight regulation as well as another control system which is operative exclusively for flash illuminated exposures and which does not otherwise interfere with the daylight exposure regulating system. Providing such dual regulating systems within a fully automated camera and, particularly, a camera which is of such thin and compact design as to be conveniently carried within a pocket of a garment poses complex design considerations.

In one fully automated but thin and compact camera described in U.S. Pat. No. 3,714,879, an exposure control system is described wherein both aperture and exposure interval are automatically varied in accordance with scene lighting conditions. This exposure control system operates in conjunction with a single lens reflex viewing system as well as with a motorized form of automatic film processing. Exposure regulation within the thin, fully automated but compact camera takes place as part of a multi-step program involving the conversion of an optical path between viewing and exposure operational modes.

The shutter-aperture components of the exposure mechanism of the noted reflex camera are normally open for viewing and focusing and are energized to close the taking aperture both for operational mode conversion as well as for terminating exposure interval. An optimized automatic weighting of aperture and exposure interval in accordance with a predetermined program is derived with the control system through the use of a progressively varying aperture movement during any given exposure interval.

A follow-focus control technique for such an exposure control system is described in a co-pending application for U.S. Patent entitled, "Focus Responsive Exposure Control System," by Vaito K. Eloranta and Edwin K. Shenk, Ser. No. 135,211, filed Apr. 19, 1971, and assigned in common herewith. The latter application describes a second flash mode control system wherein an electromagnetic device such as a solenoid is selectively maneuvered and energized to extend its plunger and arrest the position of exposure-aperture blades in accordance with focal setting.

To achieve optimum compactness in an overall camera design of the above described variety, it is necessary to incorporate both exposure control features within a very compact and thin exposure housing. Further, one of the control systems must not be permitted to interfere with the operation of the other. Additionally, it is desirable to provide a "trim" function to accommodate for slight variations in the sensitometric characteristics of film as well as to insert a modicum of personal or overriding control over the automated system. Ideally, such trim controls are provided with only one manually adjusted control component. Should a dual trim system for flash and ambient modes be provided having more than one control element a camera operator may become confused or overlook a requirement for providing a trim control for that mode of operation which he is currently using. Additionally, it is desirous that any follow-focus system within a dual parameter exposure regulation arrangement be amendable to relatively simple factory calibration.

SUMMARY OF THE INVENTION

The invention now presented offers a fully automatic exposure control mechanism and system having follow-focus capability and which provides for a range responsive aperture adjustment within the extremely limited confines of a thin, compact photographic camera suited for facile carrying within the pocket of a garment.

Another feature of the invention provides an exposure control mechanism and system which is operative in accordance with a dual exposure parameter program when performing in ambient or daylight illumination and which provides a follow-focus aperture regulation for operation under transient or flash illumination conditions. This dual regulation is available from within an exposure housing of highly miniatured dimensions.

Selectively actuated by an electromagnetic drive mounted in stationary fashion within an exposure housing, the follow-focus exposure control mechanism utilizes a cam which is driven from the focusing elements of the camera and which performs in conjunction with an interceptor to selectively capture the shutter-aperture blades of the system.

Through appropriate biasing techniques, the interceptor elements of the control system are readily retained in a retracted and non-interfering position during ambient or daylight mode operation of the camera.

Through the use of a radial follower attachment between the interceptor arrangement and the cam, a trim function can be incorporated within the exposure control housing with very few and simply mounted components.

Another feature and object of the invention is to provide a follow-focus exposure control system incorporating a unitary manual trim feature which is operative in correspondence with the trim function of a dual parameter light responsive exposure control circuit. With the control system of the invention, a camera operator need only insert one trim setting for either ambient or flash mode operation.

Another object of the invention is to provide a follow-focus mechanism for a fully automated exposure control mechanism of the type described which is readily factory calibrated through the simple adjustment of a singular threaded component.

Other objects of the invention will in part be obvious and will in part appear hereinafter.

The invention accordingly comprises the mechanism and system possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION OF THE DRAWINGS

The apparatus and system of the present invention are ideally suited for incorporation within a fully automated single lens reflex camera. To perform in reflex fashion, these cameras include a reflexing mirror or operator assembly which is normally retained in a viewing mode orientation permitting a scene to be framed and focused at a viewing surface thereon while covering film at the exposure plane of the camera within which it is located.

To derive adequate lighting for purposes of viewing and focusing, the exposure control arrangement maintains a full aperture opening and open shutter until a photographic cycle is commenced. When a camera is acutated to start such a cycle, the shutter is fully closed to secure its exposure chamber while the reflex arrangement is moved into its exposure orientation uncovering the exposure plane. Following this maneuver, an exposure is made after which the shutter is again held fully closed while the reflex assembly is returned to its initial viewing mode orientation. As this orientation is again reached, maximum aperture width is reestablished and the shutter is opened to provide for viewing and focusing in preparation for a subsequent photographic cycle.

A reflex photographic camera having components operating under the above cataloged program is described in detail in U.S. Pat. No. 3,672,281. The camera structure described therein particularly is notable for its thin and compact structure, suiting it to be conveniently carried in the pocket of a garment.

The exposure regulator preferred for incorporation in this camera is one which also is ideally suited to be confined within an exposure housing of restricted dimension in keeping with the compact structure of the camera. Described in detail in U.S. Pat. No. 3,641,889, the exposure regulating system is formed as a two-bladed shutter-aperture mechanism which is driven between relaxed and energized conditions for selectively blocking light along the optical path of a camera. The noted exposure mechanism also provides for automatic exposure control utilizing a light sensitive network and solenoid actuated drive which combine to provide a programmed weighting of aperture and exposure interval for that range of scene brightnesses most commonly encountered in conventional photographic practice.

Figures 1, 7:
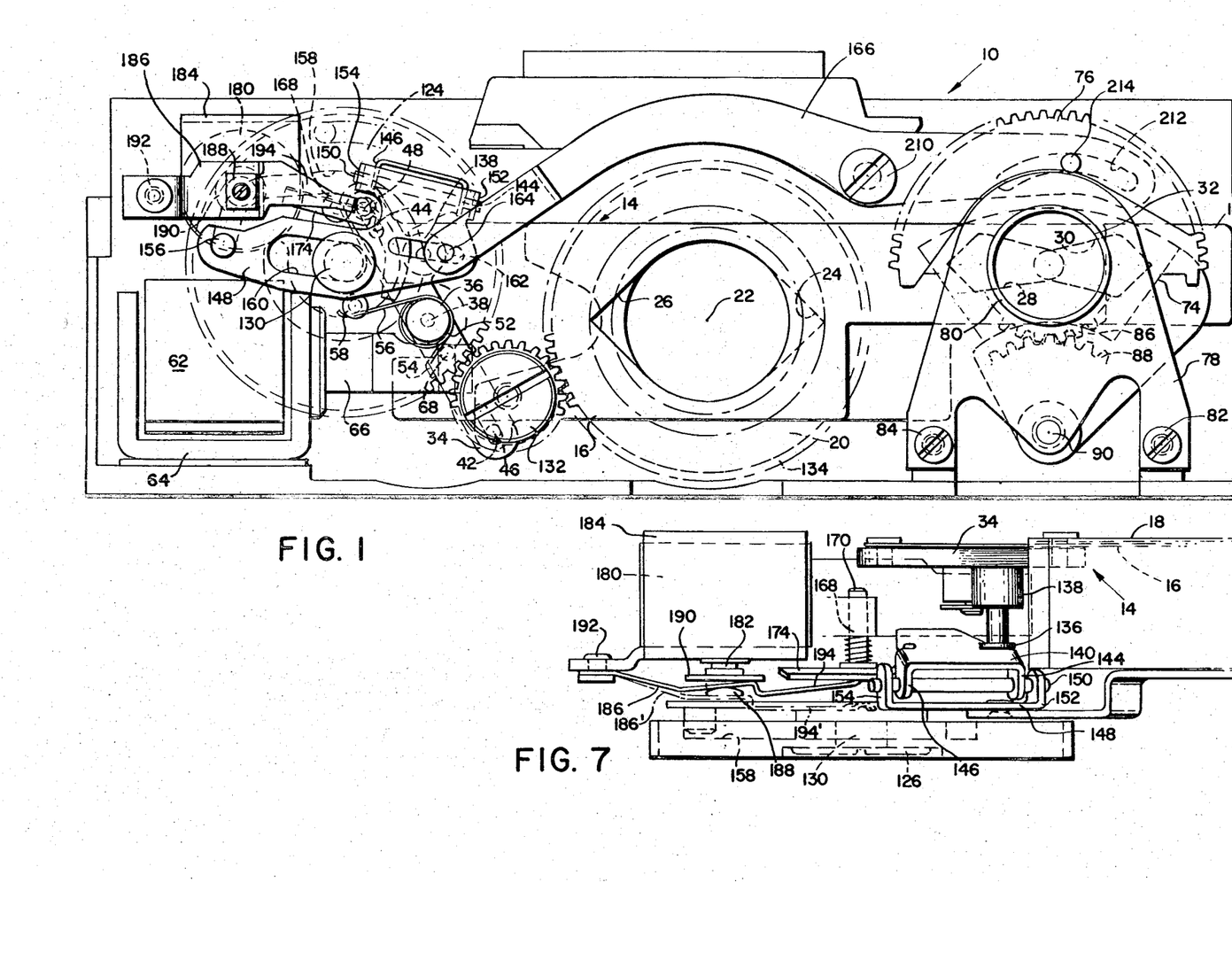
FIG. 1 is a front sectional view of an exposure control mechanism according to the invention.
FIG. 7 is a partial top sectional view of the exposure mechanism of FIG. 4.
Figure 2:
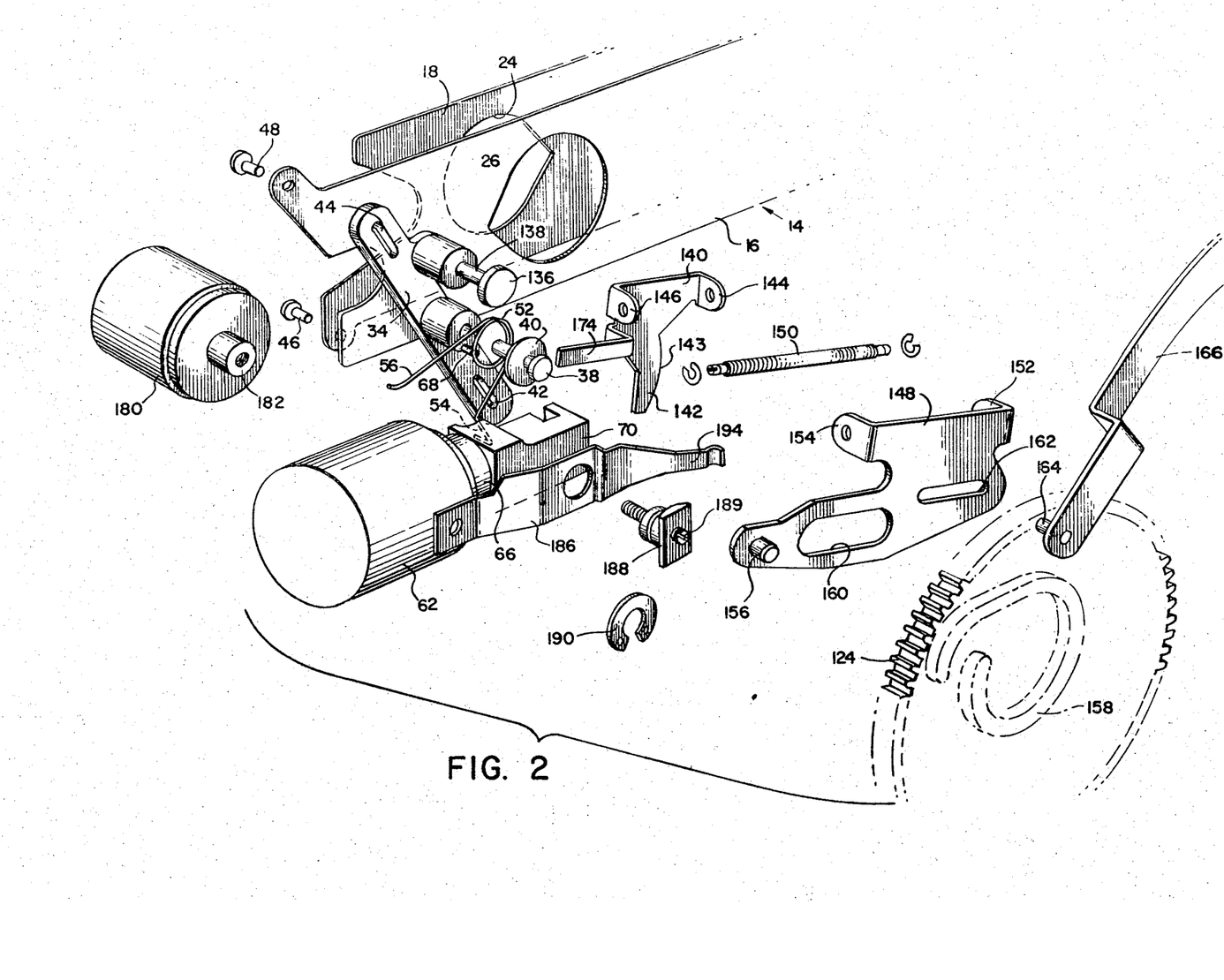
FIG. 2 is an exploded pictorial view of portions of the exposure mechanism of FIG. 1.

Referring to FIG. 1, the basic components of this shutter-aperture mechanism are revealed in detail as they are present within a compact exposure housing 10 of relatively thin front-to-back dimension. Mounted upon a rear casting 12, the exposure mechanism, shown generally at 14, is formed having two cooperatively moving shutter-aperture blades 16 and 18. Blades 16 and 18 slide horizontally within a mount (not shown) forming part of the lens housing 20 of an optical objective 22 defining the entrance of the optical path of the camera. Referring additionally to FIG. 2, each of the blades, 16 and 18, is formed having a selectively shaped aperture opening, respectively depicted at 24 and 26, movable across the optical path of the camera at 22. Depending upon the position of blades 16 and 18, aperture openings 24 and 26 symmetrically overlap over the optical path to define selectively varying aperture sizes. Each blade, 16 and 18, additionally is configured having a selectively configured and corresponding photocell sweep opening, respectively depicted at 28 and 30. Openings 28 and 30 are configured in correspondence with the contours of respective aperture openings 24 and 26. The openings 28 and 30 move with mutual symmetry over the optical path of a small entrance lens 32 providing for the passage of light from the scene being photographed to a photosensing element of a light sensitive control circuit.

Blades 16 and 18 define a continuous progression of apertures over the optical path at 22 as a result of their mutual connection with a walking beam as shown at 34. Walking beam 34 is formed having a centrally disposed hub portion 36 which is journaled for rotation about an upstanding stud (not shown) fixed within and extending from rear casting 12. A pin 38 secures the hub portion 36 over the above-noted upstanding stud. Elongate slots, as at 42 and 44, are formed in the outward tip portions of beam 34 for the purpose of providing connection with pins 46 and 48 extending, respectively, from blades 16 and 18.

Thus interconnected, the blades 16 and 18 move simultaneously and in correspondence with each other to define a continuous progression of symmetrically configured variable aperture openings over the camera optical path at 22 as well as over the photocell light path at 32. Elongate slots 42 and 44 serve the function of accommodating the horizontally restricted movement of blades 16 and 18 along a cord through the locus of rotation of the tips of beam 34.

Beam 34 is biased for rotation in a manner wherein aperture openings 24 and 26 of respective blades 16 and 18 define a relative aperture of maximum dimension over the optical path at 22. This bias is derived from a spring 52, the central portion of which is wound about pin 38 and retained in position by a washer 40. The movable end 54 of spring 52 is configured for biased contact against beam 34, while its stationary end 56 is configured to abut against a pin 58 extending from rear casting 12. With spring 52 so connected, the exposure mechanism is biased for movement into a normally open orientation when in its relaxation mode of operation as illustrated in FIG. 1.

Movement of blades 16 and 18 from their normally open orientation into a closed orientation blocking the passage of light along the optical path of the camera 22 is carried out by an electromagnetic drive operative to provide a driven mode of operation. This electromagnetic drive is present as a solenoid 62 mounted upon rear casting 12 by bracket 64. Solenoid 62 is of somewhat conventional design, having an internally disposed cylindrical plunger 66 which retracts inwardly into its spiral winding and associated casing upon energization thereof. When solenoid 62 is so energized, walking beam 34 is rotated rapidly to move blades 16 and 18 into the closed orientation shown in FIG. 3. Note in the latter figure that the entrance opening at 22 of the taking lens optical path of the camera is completely closed.

Connection between pin 68 and plunger 66 is conveniently provided by a comb-shaped connector 70 attached to plunger 66 and slideably fitted over pin 68.

Figure 3:
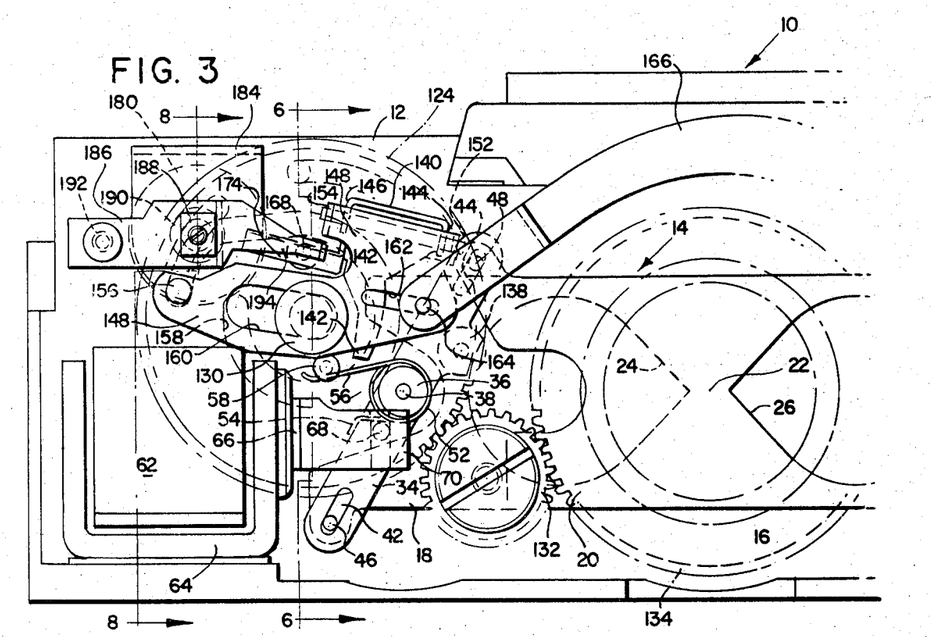
FIG. 3 is a partial sectional view of the exposure mechanism of FIG. 1 showing the components thereof during a different phase of a photographic cycle.

Following conversion of an associated reflex camera to an exposure configuration, an exposure interval commences with the de-energization of solenoid 62 following its energization to fully close shutter-aperture blades 16 and 18 as depicted in FIG. 3. With this de-energization, drive spring 52 moves blades 16 and 18 to progressively enlarge the aperture over optical path 22. Simultaneously, photocell sweep openings 28 and 30 define a corresponding progressively enlarging aperture opening over the photocell opening at 32. When an appropriate amount of light is received through window 32 to trigger a control circuit, solenoid 62 is again energized to rapidly close blades 16 and 18, thereby terminating an exposure interval. The latter energization of solenoid 62 continues until such a time as the reflex camera has reassumed its viewing and focusing mode orientation.

With the ambient operation thus described, relative aperture as well as exposure interval are selectively weighted for any given level of scene brightness so as to optimize the selection of exposure interval and aperture. To trim this ambient performance of the exposure system, an optical wedge 74, having selectively variable transmissive properties, is pivotally manipulated before the photocell positioned rearwardly of lens 32. Adjustment of the position of wedge 74 is carried out by manually rotating a semi-circular trim wheel 76 from its uppermost serrated edge. Trim wheel 76 is rotatable about opening 32 by virtue of its journaled connection with a mounting plate 78 at annular opening 80. Mounting plate 78 is attached to rear casting 12 by screws as at 82 and 84. The lowermost portion of trim wheel 76 is formed having a gear segment 86 which is meshed with a corresponding gear segment 88 formed within the lower portion of wedge 74. Wedge 74 is pivotally mounted within the assembly upon a stud 90 extending from rear casting 12. Accordingly, rotation of wheel 76, in turn, selectively drives wedge 74 from its gear segment 88 through gear segment 86.

Figure 4:
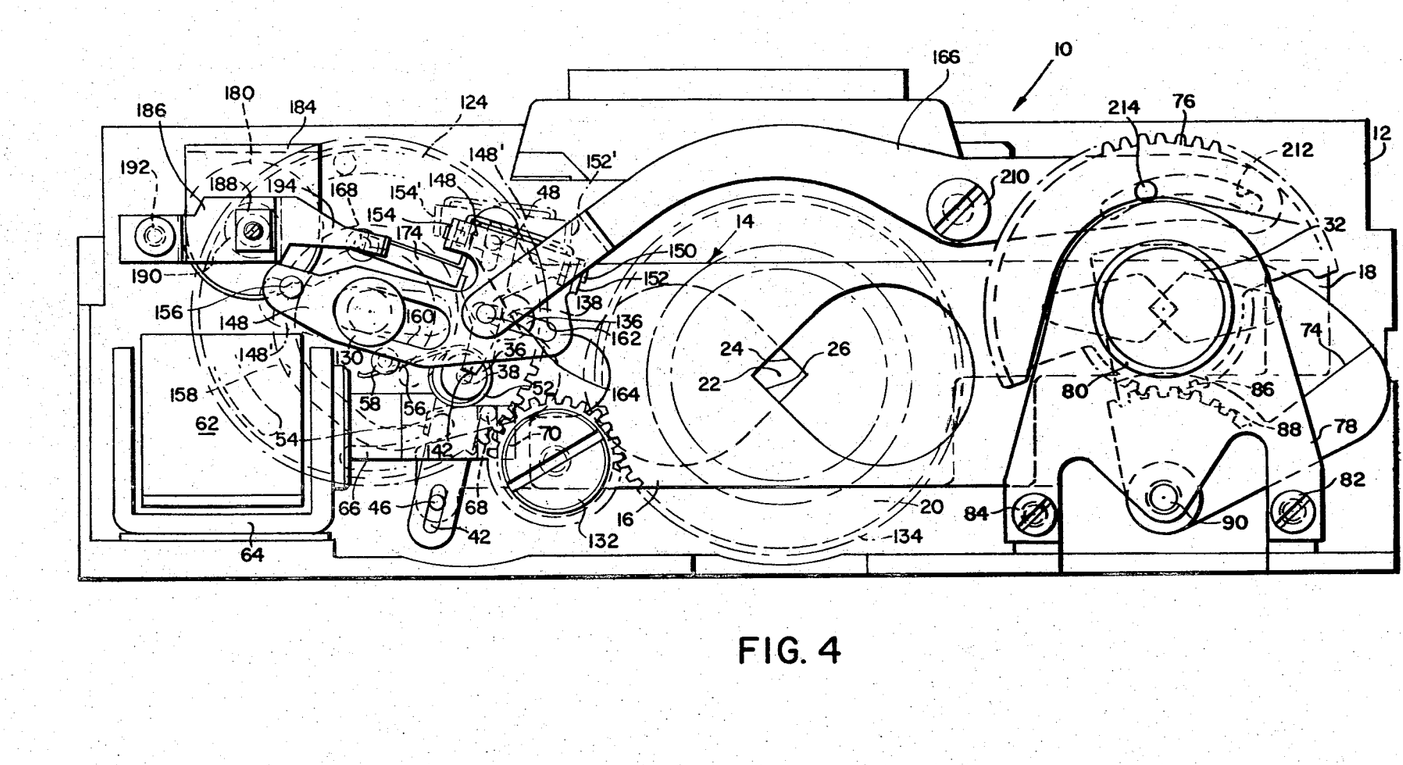
FIG. 4 is a front sectional view of the exposure mechanism of the invention showing the orientation of components thereof during an exposure interval.

Manipulation of trim wheel 76 will selectively move optical wedge 74 across opening lens 30 to adjust the amount of light permitted to enter the light sensing network through cell sweep openings 28 and 30. A given trim orientation for the assembly is depicted in FIG. 4. Appropriate indicia may be positioned upon the housing 10 to aid the camera operator in inserting an appropriate amount of trim or exposure value adjustment.

Figure 5:
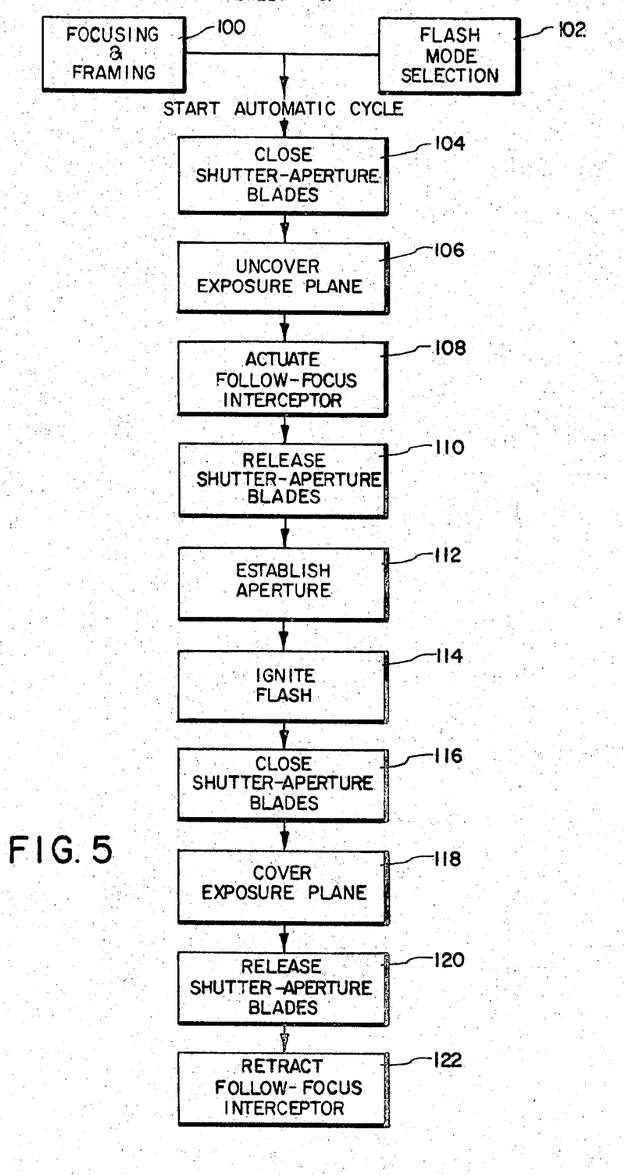
FIG. 5 is a block diagram depicting an exposure cycle of the exposure control system of the invention.

Referring to FIG. 5, the sequence of operational events occurring during flash performance of a reflex camera incorporating the subject exposure system is depicted. For instance, following focusing and framing as depicted at block 100 as well as conversion of the camera to flash mode performance as indicated at 102, an automatic cycle is commenced with the depression of a start button or the like. Pressing the start button causes the shutter aperture blades 16–18 to close as depicted at 104. The blades 16 and 18 are held closed at least until the exposure plane of the camera is fully uncovered as indicated at 106. Following the uncovering of the exposure plane as at 106 and while the shutter-aperture blades 16–18 remain closed, a follow-focus interceptor function is actuated as depicted at 108. Solenoid 62 is then de-energized to release the shutter-aperture blades 16–18 as depicted at 110. Blades 16 and 18 are driven by spring 34 to progressively open the aperture over the optical path at 22 until they are intercepted to establish an aperture as indicated at 112. Once aperture is established, a flashlamp is ignited as depicted at 114, following which solenoid 62 is again energized to close the shutter-aperture blades 16–18 as indicated at 116. While blades 16 and 18 remain closed, the exposure plane of the camera is again covered as depicted at 118, following which solenoid 62 is again de-energized to release shutter-aperture blades 16–18 for movement to define a maximum aperture width as depicted at 120. As the foregoing release 120 occurs, the interceptor function is retracted from the path of blades of 16 and 18 as shown at 122.

Figure 6:
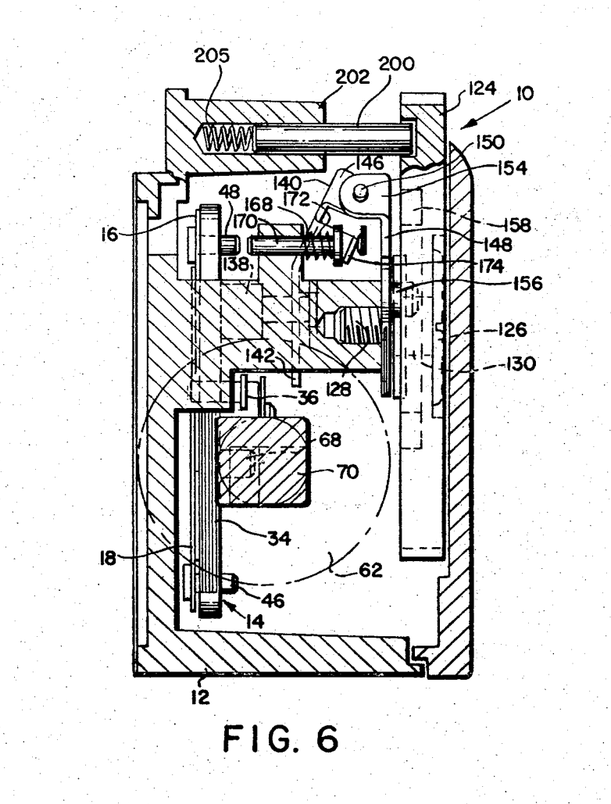
FIG. 6 is a sectional view of the exposure mechanism of the invention taken through the plane 6-6 of FIG. 3.
Figure 8:
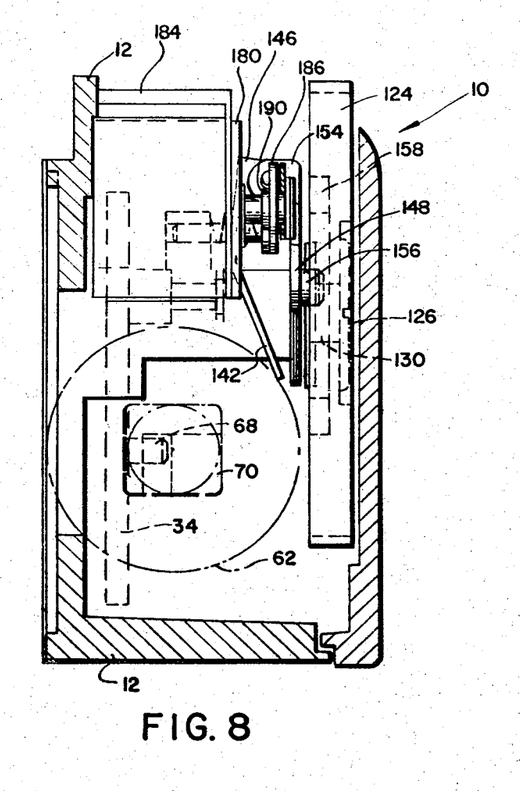
FIG. 8 is a sectional view of the exposure mechanism taken through the line 8-8 of FIG. 3.

The follow-focus interceptor functionally described in connection with blocks 108 and 122 operates in conjunction with the focusing components of the camera. Referring to FIGS. 1 and 6, a manually rotatable focus wheel 124 is shown mounted upon a pivot screw 126 along one side of exposure housing 10. Screw 126 is threadably connected at 128 (FIG. 6) to rear casting 12, extending both through focus wheel 124 and a focus wheel bushing 130 disposed between wheel 126 and threaded connection 128. Focus wheel 124 is formed having peripherally disposed gear teeth. These teeth are meshed with the teeth of an idler gear 132 which, in turn, is in driving connection with the external gear teeth of a cylindrical bezel assembly 134 retaining optical objective 22. A detailed description of assembly 134 is set forth in a co-pending application for United States patent by Rosario J. Messina entitled, "Adjustable Lens Mounting," filed Dec. 28, 1970, Ser. No. 101,745, and assigned in common herewith. Bezel 134 is rotatable from focus wheel 124 to provide objective lens focusing and, as may be apparent, the rotational orientation of focus wheel 124 continuously corresponds with the focus setting of the lens system.

Looking additionally to FIGS. 2 and 7, walking beam 34 is formed supporting a follow-focus striker pin 138 at the forward edge of its upper side. Pin 138 moves through a predetermined arcuate locus of travel as blades 16 and 18 are driven either under the bias of spring 52 or from the plunger 66 of solenoid 62. For follow-focus operation, the movement of walking beam 34 along its locus of travel establishing increasingly widening apertures is selectively arrested to establish a predetermined focus responsive apertural value. Motion arrest is provided generally by a follower linkage which includes, inter alia, an interceptor component or arresting link 140 which is selectively positioned within the above-noted locus of travel so as to contact striker pin 138 to halt the exposure mechanism as it moves under the bias of spring 52. Contact with striker pin 138 is effected at a downwardly extending leg portion 142 of interceptor arresting link 140. Relative positioning of link 140 within the locus of travel of striker pin 138 is provided by virtue of its hinged connection through tabs 144 and 146 with an interceptor assembly 148 incorporating a cam follower. Hinged connection is established by a threaded hinge pin 150 passing through tabs 144 and 146 and journaled for rotation between supporting tabs 152 and 154 of assembly 148.

Cam follower interceptor assembly 148 is operatively associated with the rotational orientation of focus wheel 124. This association is provided by the radial connection of a follower 156 extending from assembly 148 and slidably driven in positive fashion by a face-groove cam 158 formed within the inward face of focus wheel 124. To provide for radial performance, cam follower assembly 148 is formed having an elongate slot at 160 dimensioned to fit over the bushing 130 and pivot screw 126 assembly of the focus wheel 124. Selective restriction of rotation of assembly 148 about the pivotal axis established by slot 160 in engagement with bushing 130 is provided by a second elongate trim slot 162 as it is engaged with pin 164 of a trim link 166. Note from FIG. 7 that the cam follower interceptor assembly 148 and its associated interceptor arresting link 140 are formed as relatively thin stampings which are capable of closely nesting in juxtaposition to the internal face of focus wheel 124. As such, these components require a minimum of front-to-back packaging volume.

Referring to FIGS. 2, 6 and 7, an arrangement for enabling or actuating the follow-focus system, and more particularly, interceptor arresting link 140 is revealed in more detail. Component 140 is selectively movable into the arcuate locus of travel of striker pin 138 as a result of its hinged connection at hinge pin 150. Inasmuch as this interceptor must be removed from the noted locus of travel of pin 138 during select portions of the flash mode photographic cycle as well as throughout an ambient mode cycle, it is biased to retract inwardly against the surface of cam follower interceptor assembly 148. This bias is provided by a spring loaded plunger assembly 168. Assembly 168 includes an interceptor return pin 170 which is journaled for slidable movement within a bore formed within rear casting 12. Outward bias for assembly 168 is provided by a spiral spring 172 slidably wound about pin 170 and abuttably seated between the head thereof and rear casting 12. The head of pin 170 is positioned to abut against an extension 174 of interceptor arresting link 140, thereby urging the retraction of link 140 from its position engaging the exposure mechanism at pin 138. This step in the series of events taking place during a flash mode operation of a photographic cycle has been discussed in connection with block 122 of FIG. 5.

Actuation of the follow-focus interceptor as described at 108 in FIG. 5 is provided by select energization of an electromagnetic drive. Looking to FIGS. 1, 2, 7 and 8, this electromagnetic drive is illustrated as comprising a solenoid 180 having an internally disposed plunger 182 which is retractable within the solenoid upon energization thereof. Solenoid 180 is mounted in stationary fashion upon rear casting 12 by a bracket 184. The outwardly extending tip of solenoid plunger 182 is connected to a pull-down bar 186. Connection with bar 186 is made by a rectangular headed adjusting nut assembly 188 which threadably engages a screw 189 also threadably engaging a centrally disposed tapped bore formed within the tip of plunger 182. A retainer ring 190 (FIG. 7) is positioned over the assembly 189 on the opposite side of pull-down bar 186. Rotation of screw 189 moves assembly 189 as well as bar 186 inwardly or outwardly with respect to the tip of plunger 182. Pull-down bar 186 is loosely pivoted to a forward portion of bracket 184 by a rivet 192. The bar 186 additionally is configured having an extended arm portion 194 which is arranged to slideably contact and abut against the outward surface of extension 174 of link 140. This abuttable contact is available throughout the focus and trim adjustment of the position of link 140.

When solenoid 180 is energized, its plunger 182 is retracted internally to, in turn, pivot pull-down bar 186 inwardly about its loose connection at rivet 192. This motion pivots link 140 about its hinged connection at pin 150 into the locus of travel of striker pin 138 against the bias of spring loaded plunger assembly 168. Conversely, de-energization of solenoid 180 permits plunger assembly 168 to return link 140 as well as pull-down bar 186 to their respective retracted positions against the inward face of focus wheel 124. The continuous contact between the extended arm portion 194 of pull-down bar 186 and extension 174 of link 140 is evidenced by noting the relative positions thereof for two different focal settings as represented between FIGS. 3 and 9. Further, the retracted orientations of link 140 and plunger assembly 168 are revealed in FIG. 8, while their position during interception of striker pin 138 are revealed in FIGS. 6 and 7.

To permit the control circuit of the exposure control system to de-energize solenoid 180 as early as possible in a photographic cycle, the forward tip of follow-focus striker pin 138 extending from walking beam 34 is formed to define a peripheral flange 136. Accordingly, following the establishment of an appropriate aperture in consequence of the abutment of striker tip 138 against the leg portion 142 of link 140, solenoid 180 may be de-energized and the tip 136 and leg portion 142 will remain mechanically captured. This captured status is retained until such time as shutter-aperture solenoid 62 is energized to terminate an exposure interval. Upon such terminating energization, walking beam 34 is rotated to release the mechanical capture between tip 136 and leg 142 and permit plunger assembly 168 to return interceptor or link 140 to its retracted position.

Figure 10:
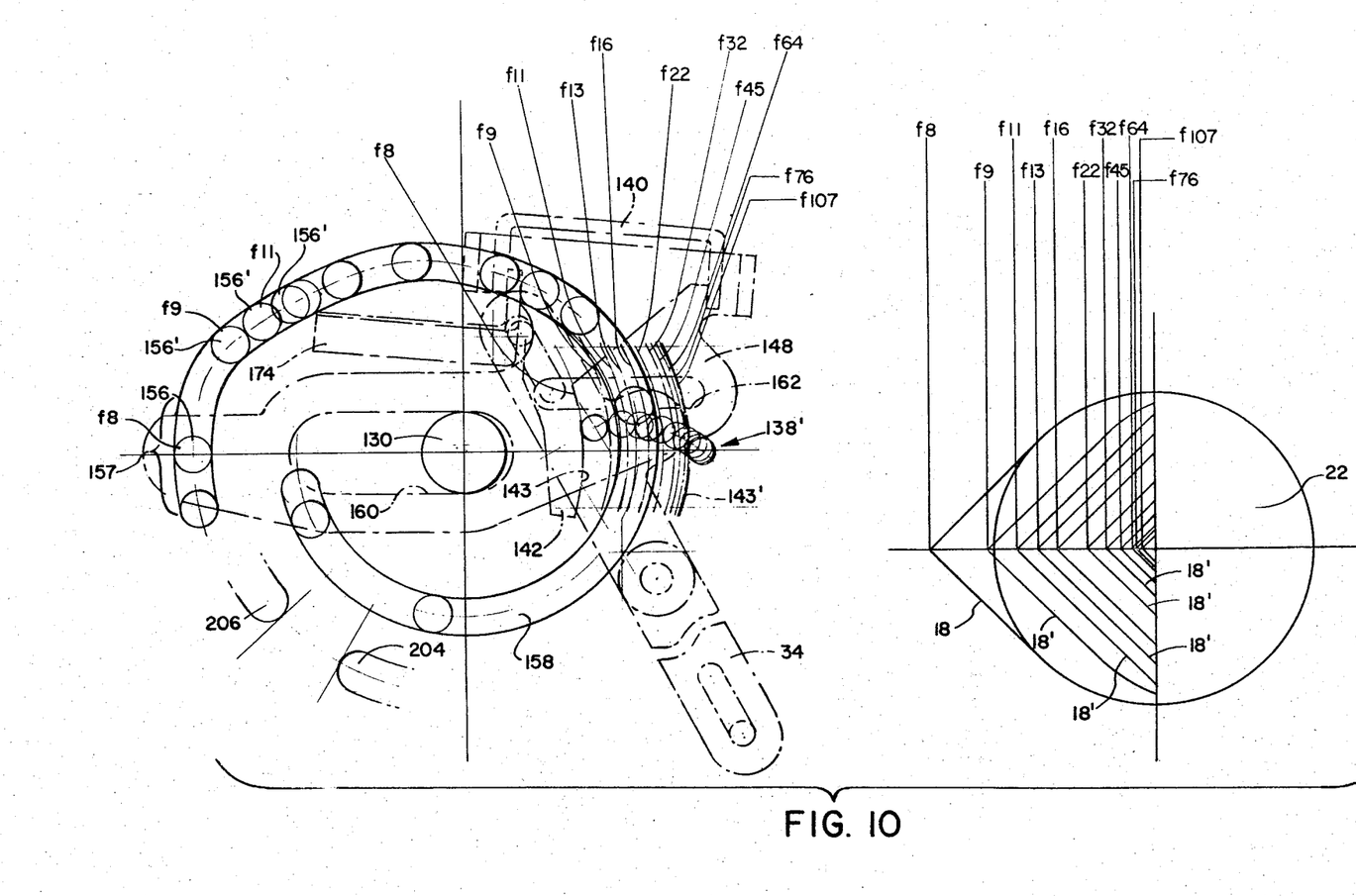
FIG. 10 is a schematic view of the follow-focus mechanism of the invention as well as the aperture of the exposure control mechanism thereof illustrating the performance thereof.

Looking to FIG. 10, the mechanical and geometric interrelation of the face groove cam 158, interceptor assembly 148, link 140 and the half portion of aperture 22 defined by shutter-aperture blade 18 are portrayed in detail. Cam follower assembly 148 is slideably supported upon bushing 130 which is positioned co-axially with the center of rotation of focus wheel 124. Additionally, assembly 148 is selectively restrained from rotational movement by virtue of the presence of a trim assembly pin 164 engaged within slot 162. Rotation of focus wheel 124 moves the grooved cam 158 to drive the assembly 148 imparting a radial rectilinear motion thereto along an axis established by the position of bushing 130 and pin 164. This motion positions the arcuate forward edge 143 of interceptor leg 142 to halt striker pin 138 of walking beam 34 at select orientations. In the orientation shown at F/8 on the subject drawing, leg 142 is positioned to establish a fully open aperture. Other positions of edge 143 serving to arrest pin 138 to establish progressively diminishing apertures up to about F/107 are shown at 143'. Similarly, the positions at which striker pin 138 is intercepted for these diminishing aperture sizes are shown as circles at 138'. The locus of travel of pin 138 as illustrated by the series of circles at 138' describes a segment of a circle, the center of which coincides with the center of rotation of walking beam 34.

Relative positions of follower pin 156 within cam 158 for various focal adjustments of focus wheel 124 are identified at 156'. These serially disposed positions of pins 156' about cam 158 follow the same F-number sequence identified in connection with forward edge positions 143' as well as with the serially disposed positions 18' of shutter-aperture blade 18. It should be understood, of course, that the position identifications of pin 156 shown at 156' are those with respect to cam control source 158 as opposed to focus wheel position. The radial position or azimuth of pin 156 remains stationary with respect to the rotation of focus wheel 124 except during trim adjustment.

Note that cam 158 is configured to provide a dwell portion 157 at which a continuous maximum aperture (shown as F/8) is established. This portion of the focusing range represents subject distances from infinity to the practical output range of the source of artificial illumination being used. As this effective range is reached, the cam 158 is configured to commence to slide cam assembly 148 along the noted radial axis in a manner causing edge 143 to define progressively increasing numerical values of aperture.

It may be further noted that any point on the forward edge 143 of the interceptor 140 defines a radius about the center of rotation of focus wheel 124 (center of bushing 130) which progressively increases in size as assembly 148 is moved outwardly. Further, the locus of motion of striker pin 138 is one of a circle of shorter fixed radius, therefore having a different vertical orientation for each capture. To accomodate for these variations, forward edge 143 is configured to define the circumference of a circle of means radius intermediate that represented by its position defining a lower F-number value (F/8) and that radius witnessed when establishing the maximum numerical F-value of the system; i.e., the configuration minimizes error and simplifies the design of cam 158 by accommodating for the slightly different relative vertical locations of pin 138 for a range of different aperture values.

Figure 9:
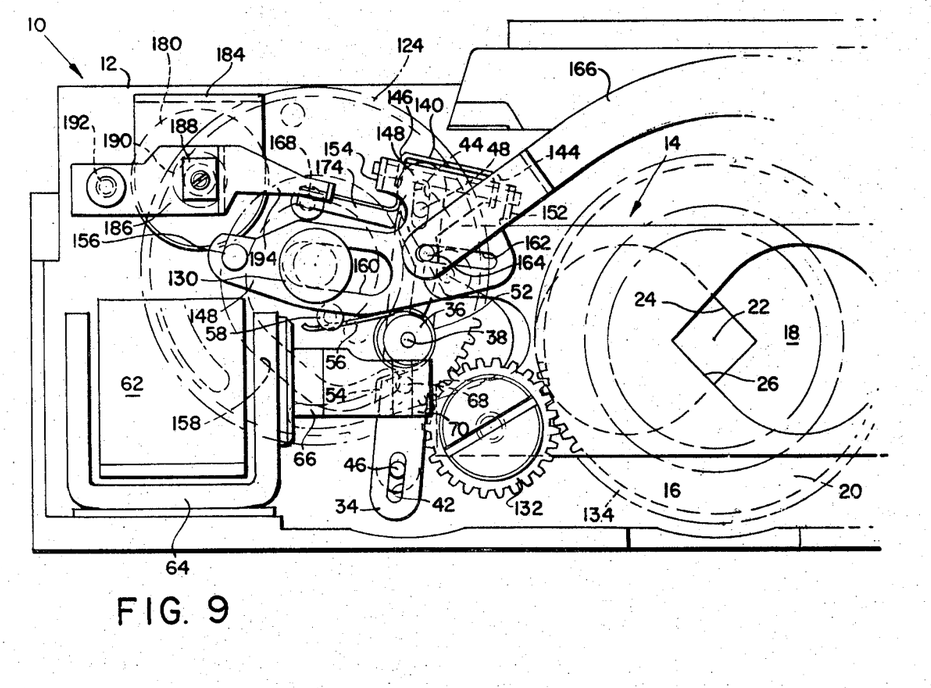
FIG. 9 is a partial sectional view of the exposure mechanism of FIG. 4 showing the alteration of components thereof following selective trimming.

Referring to FIGS. 6 and 10, a detent arrangement for limiting the extent of rotation of focus wheel 124 is revealed. The detent arrangement includes a cylindrically shaped stop pin 200, one end of which is slideably supported within a bushing 202 extending from rear casting 12. Pin 200 is biased outwardly from bushing 202 by a spring 205 so as to be urged into continual contact with an outward portion of the internal surface of focus wheel 124. This internal surface of focus wheel 124, in turn, is configured having oppositely disposed detent ramps 204 and 206 which are configured to receive the forward tip of stop pin 200 when focus wheel 124 is in an orientation representing the two extreme focal positions of the taking lens at 22. To prevent manual rotation of focus wheel 124 beyond these positions, ramps 204 and 206 are configured having cylindrically shaped leading edges which engage and abut against the tip of pin 200 when it is biased thereinto. Of course, the presence of this focus wheel stop arrangement assures that the follow-focus mechanism including follower pin 156 and the cam follower assembly 148 are not damaged due to over rotation of focus wheel 124. FIG. 9 illustrates an orientation of blades 16–18 and the follow-focus control system as they are operative during an exposure interval to establish an aperture of intermediate value and with no trim input.

Referring to FIGS. 1, 4 and 10, the components of the exposure mechanism providing a trim function for the follow-focus aperture control are illustrated. Trim information from trim wheel 76 is mechanically transmitted to the follow-focus components through a trim link 166. This link 166 has been described earlier as providing stability against rotation for interceptor assembly 148 by virtue of the slideable connection of its pin 164 with trim slot 162. Trim link 166 is pivotally mounted upon rear casting 12 by a screw 210 extending into a stand-off (not shown). From this pivotal connection at 210, the link 166 is formed on one side having a curvature extending over the taking lens at 22 to terminate at a tip incorporating the earlier described pin 164. The opposite side of the trim link 166 is formed having an arcuately-shaped slot 212. Slot 212 is dimensioned to slideably fit over a camming pin 214 extending inwardly from the inner face of trim wheel 76. As trim wheel 76 is manually pivoted to provide trim adjustment, camming pin 214 correspondingly is moved about an arcuate locus of travel which varies vertically. Such movement of pin 214, in turn, imparts a pivoting movement of trim link 166 about screw 210. This same movement is, in turn, witnessed at pin 164 positioned on the opposite leg of link 166. Such movement at pin 164 serves to rotate interceptor assembly 148 about bushing 130, representing the center of rotation not only of focus wheel 124, but also of cam 158. Accordingly, the resultant rotation of assembly 148 causes the position of camming pin 156 to be selectively advanced or retarded in its aperture defining position therewithin. The follow-focus mechanism can be adjusted or trimmed by any select exposure value through a simple manipulation of wheel 76.

An important aspect of this adjustment resides in the feature that even though the relative movement of interceptor assembly 148 for establishing F/stop variations is not linear, a given alteration of exposure value inserted by the trim system will be valid for any aperture setting. This consistency of exposure adjustment for the trim system stems from the radial mounting of cam follower assembly 148 about the center of rotation of cam 158, providing a consequent rectilinear and radial movement of assembly 148 and its interconnected link 140.

A trim setting beyond the neutral position shown in FIGS. 1 and 9 is illustrated in FIG. 4. Turning to the latter Figure, the neutral positions of the focus and trim apparatus are shown partially in phantom as they would appear in FIG. 9. A comparison of the trimmed, solid line representation of the components with the phantom representation of the components (shown having primed but identical numeration) illustrates that pin 156 has been advanced a select amount within cam 158. This increment of trim is also evidenced as a slight variation in the position of aperture blades 16 and 18 to define a slightly higher F-number value.

As described earlier in connection with FIG. 4, movement of trim wheel 76 also serves to selectively position an optical wedge 74 over the light sensing element of an exposure control system. As a consequence, any exposure value inserted as a trim from trim wheel 76 is simultaneously inserted into the follow-focus control system as well as into the ambient exposure control system. This arrangement is advantageous where the trim is inserted to accommodate for minor speed variations occasioned in the manufacture of the film being used with the photographic apparatus.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:
1. Photographic apparatus comprising:
means for initiating the energization of a source of artificial illumination having a given output intensity characteristic;
lens means adjustable to focus the image of a photographic subject positioned a given distance therefrom along an optical path at an image plane;
focusing means movable between one terminus representing a distant focus and another terminus representing a nearest focus for adjusting said lens means;
exposure mechanism means having at least one element movable along a locus of travel and defining a range of apertures over said optical path when said element is moved;
interceptor means driveably movable into said exposure mechanism means locus of travel and positionable for halting said element thereof at locations wherein said exposure mechanism means defines select exposure apertures;
cam means movable in correspondence with said focusing means movement, having a control surface contactable with said interceptor means and configured to position said interceptor means in accordance with the said intensity of said source of artificial illumination anticipated at said photographic subject; and
tractive electromagnetic means stationary with respect to said cam means and said interceptor means for selectively driving and moving said interceptor means into said locus of travel during a photographic cycle of said apparatus.

2. The photographic apparatus of said claim 1 in which said cam means control surface includes a dwell portion configured to position said interceptor means to establish a said aperture of maximum area when said focusing means adjusts said lens means at a position between said one terminus representing a said distant focus at infinity and another position representing a said subject distance corresponding with the maximum range of said source of artificial illumination.

3. The photographic apparatus of claim 1 including trim means adjustable for altering the respective positions of said interceptor means and said cam means control surface for trimming the said position of said interceptor means so as to vary the value of exposure along said optical path by a predetermined amount.

4. The photographic apparatus of claim 1 in which said interceptor means is slideably mounted about said cam means given axis.

5. The photographic apparatus of claim 3 including:

means selectively actuable for controlling said exposure mechanism automatically in accordance with the ambient light level of a scene being photographed;
ambient trim means for selectively varying the said automatic exposure mechanism control by a predetermined value of exposure; and
manually adjustable trim control means for simultaneously adjusting said trim means and said ambient trim means to provide said predetermined variation of exposure value.

6. The photographic apparatus of claim 1 wherein said interceptor means includes a cam follower configured and arranged for positive drive contact with said cam means control surface.

7. The photographic apparatus of claim 1 wherein said interceptor means is rectilinearly movable along a locus including said cam means given axis to establish said position for halting said exposure mechanism means element.

8. The photographic apparatus of claim 7 including trim means for rotating said interceptor means about said cam means given axis by a predetermined amount to selectively alter the relative position thereof with respect to said cam means control surface thereby trimming the said position of said interceptor means.

9. The photographic apparatus of claim 8 wherein said focusing means includes a manually adjustable focusing component rotatable about said cam means given axis.

10. The photographic apparatus of claim 9 wherein said cam means control surface is positioned upon said manually adjustable focusing component.

11. The photographic apparatus of claim 1 wherein said interceptor means includes follower means having a contact portion in slidable contact with said control surface and being slidably mounted about said given axis and configured for developing rectilinear motion in response to said cam means rotation.

12. The photographic apparatus of claim 1 in which said interceptor means is mounted for radial cam follower contact with said cam means control surface and includes an arresting link having a surface portion of predetermined radial configuration arranged to selectively contact said exposure mechanism means for halting said element thereof.

13. The photographic apparatus of claim 12 in which said interceptor means is slidably mounted about said cam means given axis.

14. The photographic apparatus of claim 12 in which said surface portion of said arresting link is configured as an arc having a radius of length selected intermediate the distance of said surface portion from said given axis when said focusing means is at said distant focus and when said focusing means is at said nearest focus.

15. The photographic apparatus of claim 12 wherein said interceptor means includes a cam follower configured and arranged for positive drive contact with said cam means control surface.

16. The photographic apparatus of claim 13 in which:

said focusing means includes a focus wheel rotatable about said cam means given axis; and said cam means control surface is formed as a component of said focus wheel.

17. An exposure control mechanism for photographic apparatus comprising:

means defining an optical path including an optical objective adjustable to image a photographic scene at an image plane;

focusing means movable to adjust said optical objective;

means for initiating the energization of a source of artificial light to illuminate said scene;

exposure regulator means having at least one element movable along a locus of travel and defining a range of apertures over said optical path in correspondence with said element movement;

interceptor means having an interceptor assembly actuable to move into said locus of travel to arrest said element so as to define a select aperture value over said optical path, and including follower means drivable to position said interceptor assembly at locations along said locus of travel defining a said select aperture;

cam means movable in correspondence with said focusing means movement and drivably contactable with said follower means for locating said interceptor assembly at a said select position establishing a said aperture value corresponding with the level of said artificial illumination anticipated at said scene;

manual trim means connected with said interceptor means for altering the position of contact of said follower means with said cam means to selectively vary a said aperture value a predetermined amount; and actuator means for selectively actuating said interceptor assembly.

18. The exposure control mechanism of claim 17 wherein:

said cam means movement is rotational; and said interceptor means is mounted for rectilinear movement in response to said cam means rotation.

19. The exposure control mechanism of claim 18 in which said follower means and said cam means are mutually configured and arranged to provide a positive drive follower contact therebetween.

20. The exposure control mechanism of claim 17 wherein:

said cam means movement is rotational about a given axis; and said interceptor means is slidably mounted in radial follower fashion about said axis and movable rectilinearly in response to said cam means rotation.

21. The exposure control mechanism of claim 20 wherein said manual trim means connection with said interceptor means is configured and arranged to selectively pivot said interceptor means about said axis to alter the position of contact of said follower means thereof with said cam means.

22. The exposure control mechanism of claim 20 in which:

said focusing means includes a focus wheel manually rotatable about said given axis;

said cam means includes a face-groove cam surface formed upon a surface of said focus wheel; and said interceptor means follower means is configured for positive drive contact with said cam surface.

23. The exposure control mechanism of claim 22 wherein said focusing means includes a positive stop means for restricting the extent of said rotation of said focus wheel to no more than one revolution.

24. The exposure control mechanism of claim 20 in which said interceptor assembly includes:

an arresting linkage pivotally connected with said follower component and selectively movable by said actuator means into said exposure regulator means locus of travel to arrest the said movement thereof.

25. The exposure mechanism of claim 24 wherein said pivotal connection between said arresting link and said follower component is configured for selectively adjusting the relative positions thereof so as to provide for calibration of the performance of said arresting link.

26. The exposure mechanism of claim 24 wherein:

said actuator means comprises tractive electromagnetic means energizable to move said interceptor component into said exposure regulator means locus of travel; and further including:

resilient means for biasing said arresting link to retract from said locus of travel.

27. The photographic apparatus of claim 17 in which:

said cam means includes a cam control surface rotatable about a given axis; and said interceptor means is slidably mounted about said cam means given axis.

28. The photographic apparatus of claim 27 wherein said interceptor means cam follower means is configured and arranged for positive drive contact with said cam means control surface.

29. The photographic apparatus of claim 27 in which said follower means is mounted for radial cam follower contact with said cam control surface and said interceptor assembly incorporates an arresting link having a surface portion of predetermined radial configuration movable into selective motion halting contact with said exposure regulator means.

30. An exposure control system for photographic apparatus operative in an ambient mode responsive to the light level of a scene being photographed and in a flash mode responsive to the level of flashlamp illumination anticipated at said scene comprising:

means defining an optical path including an optical objective adjustable to image said scene at an image plane;

focusing means movable to adjust said optical objective;

exposure mechanism means movable along a locus of travel to define a progressive variation of exposure apertures over said optical path;

drive means selectively actuable for moving said exposure mechanism means;

interceptor means actuable during said flash mode to move into said exposure mechanism means locus of travel and positionable to arrest the said movement thereof at locations defining select exposure aperture;

cam means movable in correspondence with said focusing means movement and contactable with said interceptor means for locating said interceptor means within said locus of travel at a position arresting said exposure mechanism means to establish a said exposure aperture corresponding with said level of anticipated flashlamp illumination;

actuator means for selectively actuating said interceptor means during said flash mode;

control circuit means for selectively regulating said exposure mechanism means and including:

light sensitive circuit means operative during said ambient mode to vary an electrical parameter in correspondence with the level of said scene light for selectively actuating said drive means to control the said exposure mechanism in accordance with said parameter; and flash mode circuit means operative during said flash mode for controlling said exposure mechanism means by selectively actuating said drive means and said actuator means to move said interceptor means into said locus of travel;

selector means actuable to cause said exposure control system to operate in a select one of said flash or ambient modes; and trim means for simultaneously manually effecting a predetermined exposure value alteration of the exposure regulating performance of said light sensitive circuit means and said interceptor means.

31. The exposure control system of claim 30 wherein said trim means includes manually adjustable means for altering the position of contact between said interceptor means and said cam means to selectively vary the value of exposure deriving therefrom and, simultaneously adjust said light sensitive circuit means in a manner altering the said variation of said electrical parameter an amount substantially equivalent to said exposure value.

32. The exposure control system of claim 31 in which:

said cam means includes a cam control surface rotatable about a given axis;

said interceptor means includes cam follower means in radial contact with said cam control surface; and said trim means manually adjustable means includes first linkage means for altering the position of said contact of said cam follower means with said cam control surface.

33. The exposure control system of claim 32 in which said interceptor means cam follower means is slidably mounted about said cam means given axis; and said cam follower means is in positive drive contact with said cam control surface.

34. The exposure control system of claim 33 in which said trim means first linkage means is configured for selectively pivoting said interceptor means cam follower means about said given axis to provide said position of contact alteration.

35. The exposure control system of claim 32 in which said trim means manually adjustable means includes second linkage means movable in correspondence and simultaneously with said first linkage means to provide said light sensitive circuit means adjustment.

36. The exposure control system of claim 35 in which said second linkage means includes selective light attenuating means movable with respect to said light sensitive circuit means to effect a said variation of said electrical parameter.

37. An exposure control system for photographic apparatus operative in an ambient mode responsive to the light level of a scene being photographed and a transient mode for performing in accordance with the level of transient illumination anticipated at said scene comprising:

means defining an optical path including an optical objective adjustably movable to image said scene at an image plane;

exposure mechanism means for defining a progressive variation of exposure apertures over said optical path;

means defining a cam movable in correspondence with said adjustive movement of said optical objective;

follower linkage means drivably movable by said cam, when actuated, to establish by way of said exposure mechanism means an exposure aperture corresponding with said level of anticipated transient illumination;

actuator means for selectively actuating said follower linkage means for said transient mode;

light sensitive circuit means operative during said ambient mode to vary an electrical parameter in correspondence with the level of said scene light for regulating the interval of a said exposure;

transient mode circuit means operative during said transient mode to regulate the interval of a said exposure; and unitary trim means for manually effecting a predetermined exposure value alteration of both the exposure regulating performance of said light sensitive circuit means and said follower linkage means.

38. The exposure control system of claim 37 further including selector means actuable to cause said exposure control system to operate in a select one of said transient or ambient modes.

39. The exposure control system of claim 37 in which:

said cam is formed having a control surface rotatable about a given axis; and said follower linkage means is in contact with said control surface and movable with respect thereto in response to manual actuation of said unitary trim means.

40. The exposure control system of claim 37 in which said unitary trim means includes manually adjustable means for selectively altering the operational association of said cam and said follower linkage means to selectively vary the value of exposure deriving therefrom, and for simultaneously adjusting said light sensitive circuit means in a manner altering the said variation of said electrical parameter.

41. The exposure control system of claim 37 in which said follower linkage means includes aperture defining linkage means for operatively associating said exposure mechanism means and said cam movement.

42. The exposure control system of claim 37 in which:
said cam is rotatably movable about a given axis; and
said follower linkage means is radially contactable with said cam.

43. The exposure control system of claim 37 in which said trim means includes manually adjustable means for altering the orientation of said follower linkage means to selectively vary the value of exposure deriving therefrom and, simultaneously adjust said light sensitive circuit means in a manner altering the said variation of said electrical parameter an amount substantially equivalent to said exposure value.

44. The exposure control system of claim 43 in which said trim means manually adjustable means includes:
first linkage means movable to alter the orientation of said follower linkage means; and
second linkage means movable in correspondence and simultaneously with said first linkage means to provide said light sensitive circuit means adjustment.

45. The exposure control system of claim 44 in which said second linkage means includes selective light attenuating means movable with respect to said light sensitive circuit means to effect a said variation of said electrical parameter.

46. A camera system comprising:
a housing adapted to mount a film unit;
means on said housing for mounting a source of artificial light;
variable aperture defining means positioned on said housing to be disposed intermediate a subject and the film unit to control the amount of scene light incident upon the film unit;
first means operable in a transient illumination exposure mode for varying the size of said aperture as a function of camera-to-subject distance;
second means operable in an ambient light exposure mode for determining an exposure value as a function of the level of ambient light; and
unitary trim means for adjusting the response of said first means to camera-to-subject distances and the response of said second means to ambient light levels.

47. The camera system of claim 46 in which said first means includes:
means defining a cam having a control surface movable to a position corresponding with said camera-to-subject distance; and
follower linkage means contactable with said control surface and movable with respect thereto in response to manual actuation of said unitary trim means.

48. The camera system of claim 47 in which said unitary trim means includes manually adjustable means for selectively altering the operational association of said cam control surface and said follower linkage means to selectively vary the value of exposure deriving therefrom, and for simultaneously adjusting said second means in a manner altering the said determination of said exposure value.

49. The camera system of claim 48 in which said unitary trim means manually adjustable means is operative to simultaneously alter the value of exposure determined by said first and second means by a substantially equivalent amount.

50. The camera system of claim 48 in which:
said unitary trim means manually adjustable means includes first linkage means coupled with said follower linkage means for selectively imparting movement thereto; and
second linkage means movable in correspondence and simultaneously with said first linkage means to provide for adjustment of said second means exposure value.

51. The camera system of claim 50 in which said second linkage means includes selective light attenuating means movable with respect to said second means to effect said adjustment of said exposure value.

52. A camera system comprising:
a housing adapted to mount a film unit;
first means on said housing for mounting a source of artificial light;
second means operable in a transient light exposure mode for determining the value of an exposure parameter as a function of camera-to-subject distance and operable in an ambient light exposure mode for determining the value of an exposure parameter as a function of the level of ambient light, said second means including means for defining an aperture in said artificial light exposure mode the size of which is a function of said camera-to-subject distance, said aperture being disposed intermediate a subject and the film unit to control the amount of scene light incident upon the film unit during said artificial light exposure mode; and
unitary trim means for simultaneously adjusting the response of both of said exposure parameter values determined by said second means.

53. The camera system of claim 52 in which said second means includes:
means defining a cam having a control surface movable to a position corresponding with said camera-to-subject distance; and
follower linkage means contactable with said control surface and movable with respect thereto in response to manual actuation of said unitary trim means.

54. The camera system of claim 53 in which said unitary trim means includes manually adjustable means for selectively altering the operational association of said cam control surface and said follower linkage means to selectively vary said exposure parameter value deriving therefrom and for simultaneously adjusting the said value of exposure parameter representing a function of the said level of ambient light.

55. The camera system of claim 54 in which said unitary trim means manually adjustable means is operative to simultaneously alter said value of exposure parameter substantially equivalent amounts.

56. The camera system of claim 54 in which:
said unitary trim means manually adjustable means includes first linkage means coupled with said follower linkage means for selectively imparting movement thereto; and second linkage means movable in correspondence and simultaneously with said first linkage means to provide for adjustment of said value of exposure parameter representing a function of the said level of ambient light.

57. The camera system of claim 56 in which:
said second means includes light sensitive circuit means operative during said ambient light mode to vary an electrical parameter in correspondence with the level of said ambient light for regulating the interval of an exposure; and said second linkage means includes selective light attentuating means movable with respect to said light sensitive circuit means to effect an adjustment of said electrical parameter.

* * * * *